May 15, 1945.  E. W. WELP  2,376,298
APPARATUS FOR HEATING HARD WATER
Original Filed March 21, 1940
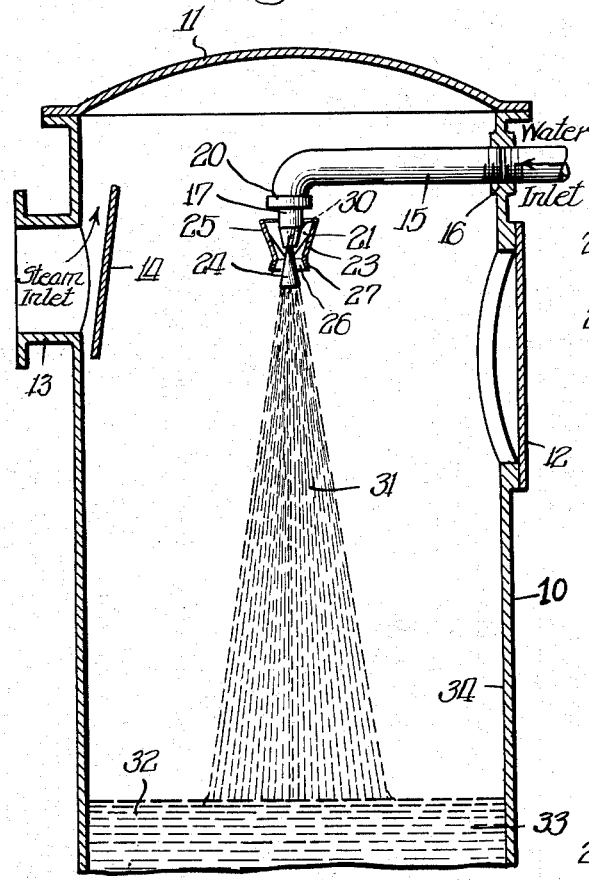
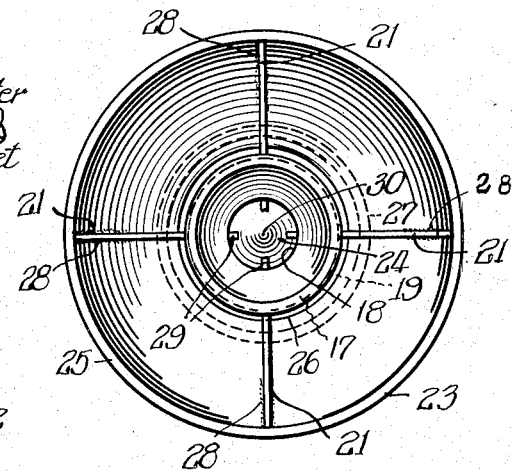
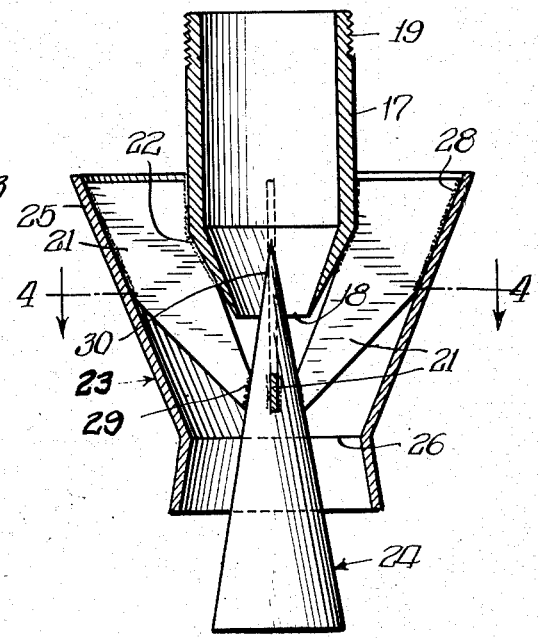
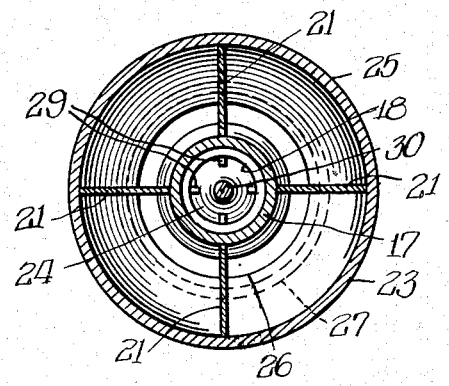
INVENTOR.
Edward W. Welp,
BY Patented May 15, 1945

2,376,298

UNITED STATES PATENT OFFICE 2,376,298

APPARATUS FOR HEATING HARD WATER

Edward W. Welp, Chicago, Ill., assignor to Graver Tank & Mfg. Co., Inc., Catasauqua, Pa., a corporation of Delaware Continuation of application Serial No. 325,115, March 21, 1940. This application May 22, 1942, Serial No. 444,051

9 Claims. (Cl. 261—116)

This invention relates to an apparatus for heating hard water by steam. It has more particular reference to a hot process water softener having improved means for preheating the water in a restricted chamber to eliminate scale forming impurities. This latter application will be described for purposes of illustration but the invention is not to be limited thereby.

It is an object of this invention to provide a novel apparatus for preheating water of high bicarbonate hardness and which will eliminate the possibility of scale formation on the walls of the preheating vessel.

Another object is so to control the flow of water and steam as to reduce or eliminate the possibility of scale formation on the walls of the heating vessel.

Another object resides in the provision of a preheater having an improved jet for combining steam and water and means for discharging the water as a relatively thin, rapid, integral stream, said stream being subjected to the heating action of high temperature steam in surrounding relation therewith.

Still other objects may appear from the following disclosure.

In the drawing, Figure 1 is a vertical sectional view showing a hot process water softener embodying the features of the invention;

Figure 2 is a top plan view of the improved nozzle and divider cone of the invention;

Figure 3 is a vertical sectional view of the nozzle and divider cone showing the arrangement of the several parts; and Figure 4 is a horizontal sectional view taken substantially along line 4—4 of Figure 3.

The embodiment of the invention illustrated in the drawings comprises the preheater compartment of a softener tank 10 having a member 11 providing a top closure for the tank, a removable door 12 in the nature of an inspection door so that access may be had to the interior for purposes of repair and the like, and a steam inlet 13 located on the side of the tank opposite the inspection door 12. An interior baffle 14 is located adjacent the steam inlet for directing the steam toward the upper portion of the tank.

The pipe 15, extending within the tank to substantially the center thereof, continuously supplies cold water for treatment to the preheater of the invention. Said pipe is suitably supported from the cylindrical wall of the tank by having threaded connection with the boss 16. Water from the pipe 15 is discharged into the preheater by a nozzle which in accordance with the invention supports a cone so that the water issues as a relatively thin stream which is distributed over the surface of the cone to provide the greatest degree of contact between the water and the high temperature steam admitted to the preheater by the steam inlet 13.

Referring more particularly to Figure 3, the nozzle 17 having a restricted opening 18 and the threaded portion 19 is adapted to be secured to the depending end of pipe 15 by the collar 20 so that in effect said nozzle forms a continuation of the water inlet pipe. Vanes 21 are suitably welded at 22 to the exterior of the nozzle to provide a support for the Venturi-shaped steam jet 23 and a support for the cone 24. The steam jet along portion 25 has a gradually decreasing diameter in a downward direction until the restricted throat 26 is reached, whereupon the skirt 27 flares outwardly. Along the upper interior surfaces of portion 25 the steam jet is suitably welded as at 28 to the vanes 21 and said vanes also have welded thereto at 29 the cone 24 which is concentric with the steam jet 23 and with the nozzle 17 having its pointed end indicated by numeral 30 extending within the opening 18 of the said nozzle.

It will be noted that I provide a body or reservoir of heated water, a superposed body of steam, and a wall structure confining both bodies. The assembly of the nozzle, cone, and Venturi member is so constructed, installed, and operated that the conical sheet of water, 31, which is discharged from this assembly, falls upon the surface 32 of the body of heated water 33 which is accumulated in the tank, at points spaced from the wall 34 which confines this body of water.

It will be understood that the hard water which enters the tank 10 through the pipe 15 may have been dosed with lime, soda, phosphate or the like; or such dosage may follow later. In some instances, chemical treatment can be dispensed with altogether.

In earlier apparatus, the water has been discharged into the heating chamber in form of a spray impinging on the walls of the chamber. Thus there has been contact between the water in which the incipient chemical or thermal softening reactions take place, and the walls of the heating chamber. Such contact, when continued over some period of time, with a water containing a large amount of bicarbonate hardness, causes a heavy scale to be formed on the walls of the heating chamber. Actually, such scale is formed at least as fast as in a steam boiler supplied with hard feed water.

The formation of scale in the heater is objectionable for at least some of the reasons which apply in case of steam boilers. Among other things, this growth of scale, when unchecked, will ultimately restrict the treatment space in the heater chamber to the point where proper heat treatment is no longer possible. Furthermore, such scale formations tend to disintegrate or break off; and the scale, or parts thereof, will then drop into the sludge sump, upsetting the water in the clarification chamber, and clogging the sludge pipes and pumps. Therefore it has been necessary with prior art apparatus to interrupt the operation at frequent intervals for scale removal and repairs. Such frequent shutdowns are expensive and objectionable. All those difficulties are overcome, or at least materially reduced, by apparatus constructed according to this invention.

The nozzle assembly of this invention is preferably symmetrical in itself. In the embodiment shown this nozzle assembly is installed in the center of the tank. The nozzle assembly, and particularly its outwardly flaring discharge or end section 27 is so constructed that during proper operation thereof, a thin and smooth, not atomized stream of water issues therefrom and strikes the water surface 32. This stream should not strike the wall 34. For this purpose, the nozzle assembly is installed at such elevation, and the wall of said end section 27 has such flare and is so constructed on the inside thereof that, when its flare is continued downwardly by straight imaginary lines, it fails to reach or intersect the wall 34, but reaches and intersects the water surface 32 at points spaced from said wall. The stream of water which issues from the nozzle assembly substantially follows said imaginary lines. It flows down as a thin, smooth sheet forming a hollow cone, flowing rapidly near the apex so as to prevent the deposition of scale in the passage of the nozzle assembly, and avoiding the wall 34 so as to prevent the formation of scale on this wall.

The steam which enters the preheating chamber is upwardly deflected by the interior baffle 14 adjacent the steam inlet. It is then drawn into the nozzle assembly by the jet or injector action of the water issuing from the nozzle 18. In advance of the restricted diameter 26 and also beyond the same the high temperature steam and the relatively thin stream of water surrounding the cone are brought into intimate relation so that the greatest possible quantity of heat is transferred to the water to materially raise its temperature. The steam is caused to travel along as a result of the jet action of the member 23. In fact, although the high temperature steam is admitted at the upper end of the tank and positively directed to the upper portion of the tank by baffle means the flow of the steam will be in a downward direction within the tank because of the action of said jet as described. A double heating action is thereby given to the water since the same is discharged into the volume of steam which will thus accumulate above the water level 32.

If the Venturi member is allowed to run full of a homogeneous mixture of water and steam, the heating is particularly intense; but it is also possible to allow more or less solid streams of water and steam, respectively, to pass through the Venturi member in close contact with one another. The heating process continues as the steam and water issue from the nozzle assembly, and flow together on the way down to the water lever 32. It is this heating of the water, with or without chemical treatment, which causes the separation of scale materials. As soon as the temperature of the water reaches a certain degree, the half-bound carbon dioxide ($CO_2$) of the calcium bicarbonate ($CaCO_3H_2CO_3$) is driven off, and the remaining substance precipitated in form of crystals of the calcium monocarbonate ($CaCO_3$), with liberation of water ($H_2O$). In the case of magnesium bicarbonate ($MgCO_3H_2CO_3$) two molecules of carbon dioxide ($_2CO_2$) are similarly removed, and magnesium hydroxide ($Mg(OH)_2$) precipitated. The reaction is effected with improved success, and possibly increased velocity, if chemicals such as lime ($Ca(OH)_2$) and soda ($Na_2CO_3$) are added to the water. The formation of calcium carbonate and magnesium hydroxide is a crystallizing process. While all of this process has not been elucidated as yet, it appears that the results are largely dependent on the conditions under which precipitation is started, and the surroundings in which initial crystals are formed. If the crystals are initially precipitated in contact with solid bodies they tend to attach themselves to such bodies individually, and to cling to the same most firmly. Otherwise, they attach themselves to one another, forming flocculent particles, the sum total of which appears as a soft sludge and has little adhesive tendency. If the nascent crystals are precipitated in contact with the wall 34, they tend to form a hard and objectionable scale thereon. If there is merely contact between said wall and formed, flocculent particles of sludge, there is no such tendency, or at least it is not nearly so strong. This may explain the fact, which certainly is established by experience, that it is more objectionable to have contact between the water being heated and the wall, than between the heated water and the wall.

For this and other reasons it is desirable to heat the incoming water so quickly as may be possible within economical limits. The thin and uniform stream of water which is caused and enforced by the nozzle assembly is an ideal medium for such intensified and rapid heat reaction. Furthermore it is important to have intimate and prolonged contact of the water with the steam, wihch is insured by the method of causing contact or admixture of the two fluids in the nozzle assembly as described.

Some of the steam may be condensed as it loses heat to the water. This condensate follows the same conical, downward path that is established for the water under treatment. The uncondensed steam which forms part of the mixture issuing from the nozzle assembly, may have some tendency to expand laterally and to entrain small drops of water. In addition, there is a slight chance for disturbance as the flowing water falls on the water surface. Thus the downwardly flowing cone of water, or parts thereof, may be enveloped by a fine mist or spray filling a zone of conical shape or approximately so, and of greater diameter at some points than the first-mentioned cone of water 31. Such an enveloping mist or spray would be detrimental if it were allowed to expand unduly. It would then cause water being heated to reach the wall 34 and to trickle down. Such contact of the wall with small drops may be even more detrimental than the throwing of a fast and solid stream of water against the wall since the liquid velocity, after the impact, is insufficient to prevent scale from adhering to the wall. However, only a minimum of such lateral steam expansion and spray formation will be encountered in the operation of apparatus according to this invention. The Venturi design of the nozzle assembly causes a smooth and unobstructed discharge of the mixture of water and steam, devoid of eddies and disturbances, and limiting the said tendency of lateral expansion to a minimum. This desirable operation is aided by the aforementioned baffle 14 which guides the incoming steam upwardly, preventing lateral crosscurrents. Furthermore, the pressure within the hollow cone of flowing water 31 will be low, and steam will be drawn into this hollow space, causing a convergent rather than a divergent and expanding flow of the steam.

A part of the steam which is discharged downwardly from the nozzle assembly returns upwardly along the wall 34. Little, if any, harm can be done by that flow, since the velocity thereof is too small to support water drops of appreciable size, and the water carried thereby has already been heated to a large extent, completing the floc-forming reactions.

The arrangement, proportions, and dimensions as shown and described are subject to considerable modifications, the present disclosure being intended to illustrate but not to limit the invention, and various modifications being obvious to persons skilled in this art, upon a study of this disclosure.

This is a continuation of my application No. 325,115 filed March 21, 1940.

I claim:

1. In apparatus for heating water to remove scale-forming impurities, in combination, a tank having a reservoir in the base thereof and an inlet above the reservoir for a fluid heating medium, a nozzle in the upper end of the tank for discharging water to be heated toward the reservoir, a conical member depending from said nozzle and positioned with the apex toward the nozzle to divide the water issuing therefrom into a relatively thin stream of annular shape by causing the water to flow along the exterior surface of the conical member, and Venturi means concentrically disposed in surrounding relation with the conical member, said Venturi means having open ends and providing a restricted throat intermediate its length, whereby the fluid heating medium is caused to flow through said Venturi means in the same direction as the stream and is simultaneously confined in close proximity to the relatively thin stream flowing along the exterior surface of the conical member to raise the temperature of the water.

2. In apparatus for heating water to remove scale-forming impurities, in combination, a tank having a reservoir in the base thereof and an inlet above the reservoir for a fluid heating medium, a nozzle in the upper end of the tank for discharging water to be heated toward the reservoir, a conical member depending from said nozzle and positioned with the apex toward the nozzle to divide the water issuing therefrom into a relatively thin stream of annular shape by causing the water to flow along the exterior surface of the conical member, Venturi means concentrically disposed in surrounding relation with the conical member, said means having an inlet at its upper end and an outlet at its lower end adjacent the discharge of the stream from the conical member, and a restricted throat provided by said Venturi means intermediate the inlet and outlet ends thereof, whereby the fluid heating medium is caused to flow through said Venturi means in the direction of the stream and is simultaneously confined in close proximity to the relatively thin stream flowing along the exterior surface of the conical member to raise the temperature of the water.

3. In apparatus of the character described, a nozzle for discharging the liquid to be treated, a plurality of supporting vanes extending radially from the nozzle and depending below the discharge end thereof, a conical member located below the nozzle and positioned with its apex directed toward and centrally of said nozzle, whereby the liquid issuing from the nozzle is caused to flow along the exterior surface of the conical member as a thin stream of annular shape, said conical member having contact with the depending ends of the vanes and being secured in position by said vanes, Venturi means supported by said vanes in surrounding relation with the conical member, both ends of said Venturi means being open and said means providing a restricted passage intermediate the open ends and in close proximity to the discharge of the stream from the conical member.

4. In apparatus of the character described, a tank, a nozzle in said tank for discharging water to be treated, a conical member associated with said nozzle with its apex directed toward the nozzle for dividing the water issuing therefrom into a relatively thin stream of annular shape by causing the water to flow along the exterior surface of the conical member, Venturi means concentrically disposed with respect to the nozzle and the conical member and surrounding at least those parts of said nozzle and conical member which are adjacent the apex, said Venturi means being open at each end to communicate with the interior of the tank and providing a passage between said open ends having a restricted throat in a plane spaced from said nozzle in the direction of the stream, and steam inlet means in said tank delivering high temperature steam to said Venturi means at the end opposite the restricted throat, whereby the steam is caused to flow in the same direction as the stream of water and is confined in close proximity to the relatively thin stream flowing along the exterior surface of the conical member to thereby raise the temperature of the water.

5. In apparatus of the character described, a tank, a water inlet pipe for said tank, a nozzle assembly within the tank depending from said inlet pipe, said assembly comprising a nozzle for discharging the liquid to be treated, a plurality of supporting vanes extending radially from the nozzle, a conical member located below the nozzle and supported by said vanes with its apex directed toward the nozzle and centrally thereof, a Venturi member of substantially circular cross-section supported in surrounding relation with the nozzle and depending below the same to also encompass the conical member, both ends of said Venturi member being open and said open ends providing an inlet at the upper end and an outlet at the lower end respectively, and said Venturi member having a restricted throat intermediate said inlet and outlet.

6. In apparatus for heating water to remove scale-forming impurities, in combination, a tank adapted to confine a body of heated water and a body of steam above the surface of said water, a steam inlet above said surface, an inlet for hard water to be heated above said surface, said water inlet discharging into said tank through a circular opening, a flow dividing member associated with and adapted at least to partially enter said opening, said flow dividing member having a surface diverging from an apex in the direction of the flow of water from said water inlet, and Venturi means concentrically disposed in surrounding relation with and in close proximity to at least part of said water inlet and said flow-dividing member, said Venturi means having open ends in said tank and providing a restricted throat intermediate its ends.

7. In apparatus for heating water to remove scale-forming impurities, in combination, a tank adapted to confine a body of heated water and a body of steam above the surface of said water, a steam inlet above said surface, an inlet for hard water to be heated above said surface, a flow dividing member having a surface diverging from an apex and having said apex relatively adjacent said water inlet whereby said member is adapted to cause the water issuing from said water inlet to flow along the surface of said member and to form from the water issuing from said inlet a relatively thin stream diverging from said water inlet, and Venturi means concentrically disposed in close proximity to at least part of said water inlet and said flow-dividing member, said Venturi means having open ends in communication with the interior of the tank and providing a restricted throat intermediate its length, whereby the steam is caused to flow through said Venturi means in the same direction as said stream of water.

8. Apparatus according to claim 7 wherein said Venturi means is spaced from and supported by said flow dividing member by means of vanes.

9. Apparatus according to claim 7 wherein said steam inlet has associated therewith a flow guiding member adapted to direct the steam towards a part of said tank relatively adjacent said apex of said flow dividing member.

EDWARD W. WELP.